Figure 1:
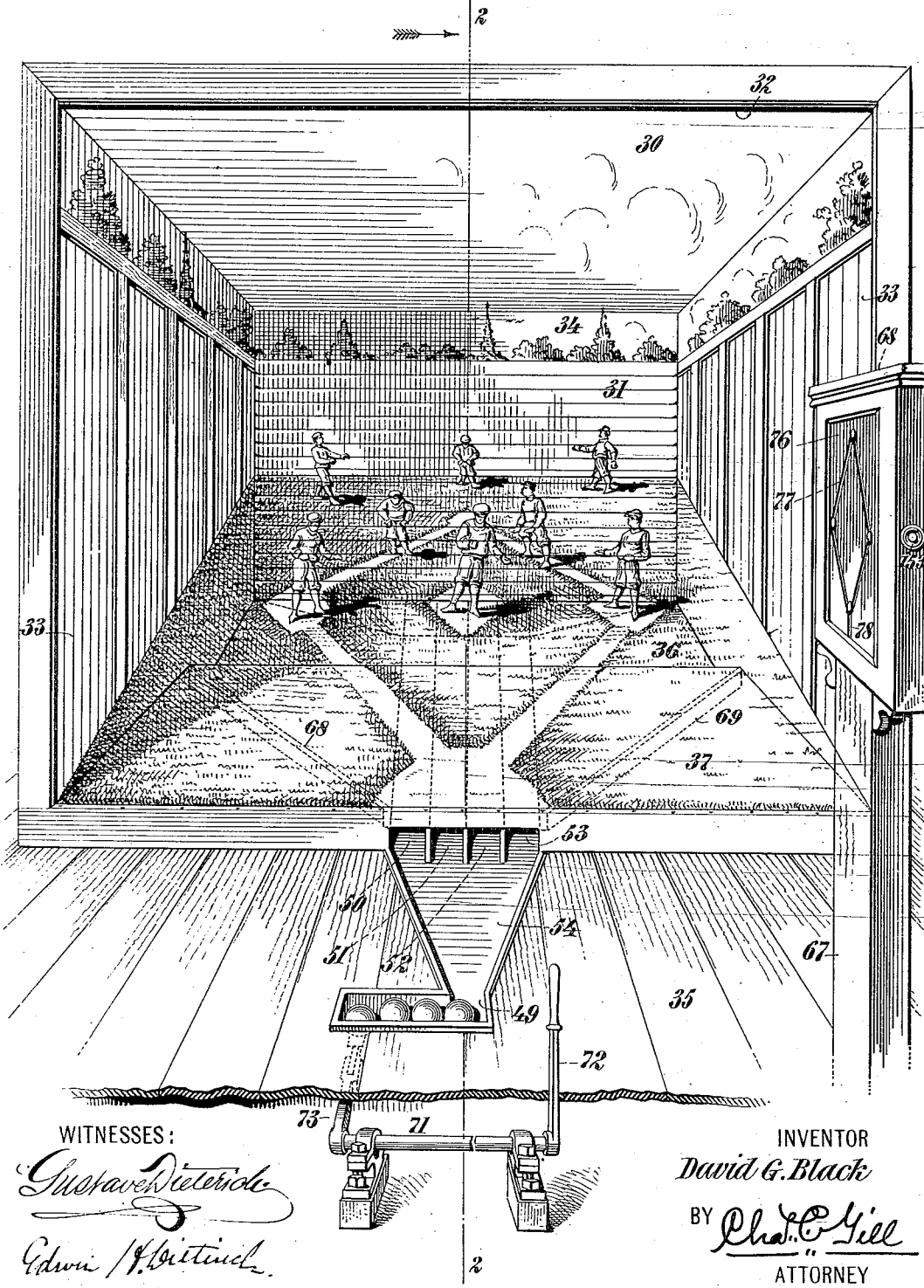

No. 856,216. PATENTED JUNE 11, 1907.
D. G. BLACK.
GAME APPARATUS.
APPLICATION FILED FEB. 15, 1907.

8 SHEETS—SHEET 1.

WITNESSES:
Gustave Dieterich
Edwin J. Dieterich

INVENTOR
David G. Black
BY Chas. C. Gill
ATTORNEY

No. 856,216. PATENTED JUNE 11, 1907.
D. G. BLACK.
GAME APPARATUS.
APPLICATION FILED FEB. 15, 1907.
8 SHEETS—SHEET 2.
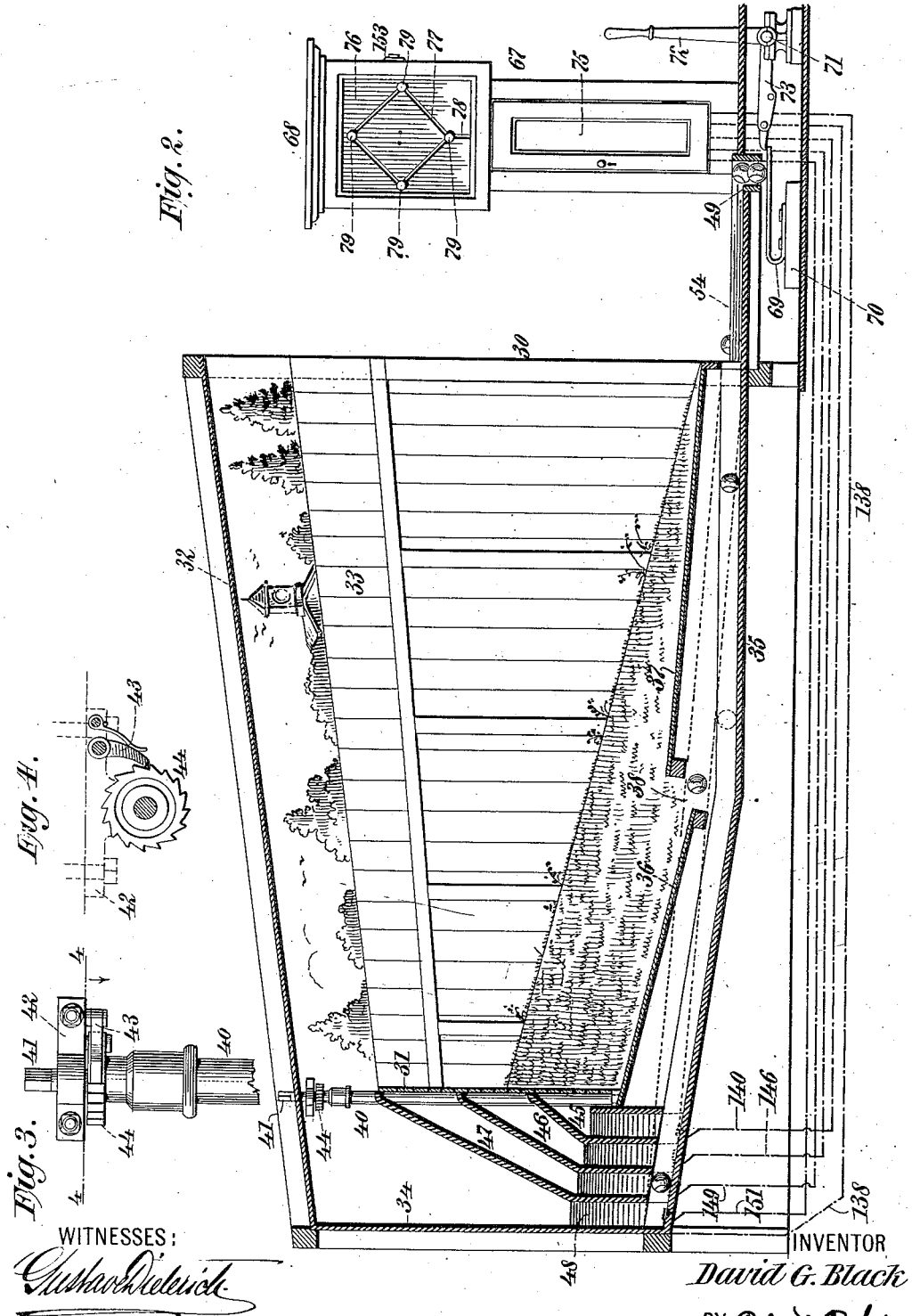
WITNESSES:
INVENTOR
David G. Black
BY
ATTORNEY No. 856,216. PATENTED JUNE 11, 1907.
D. G. BLACK.
GAME APPARATUS.
APPLICATION FILED FEB. 15, 1907.
8 SHEETS—SHEET 3.
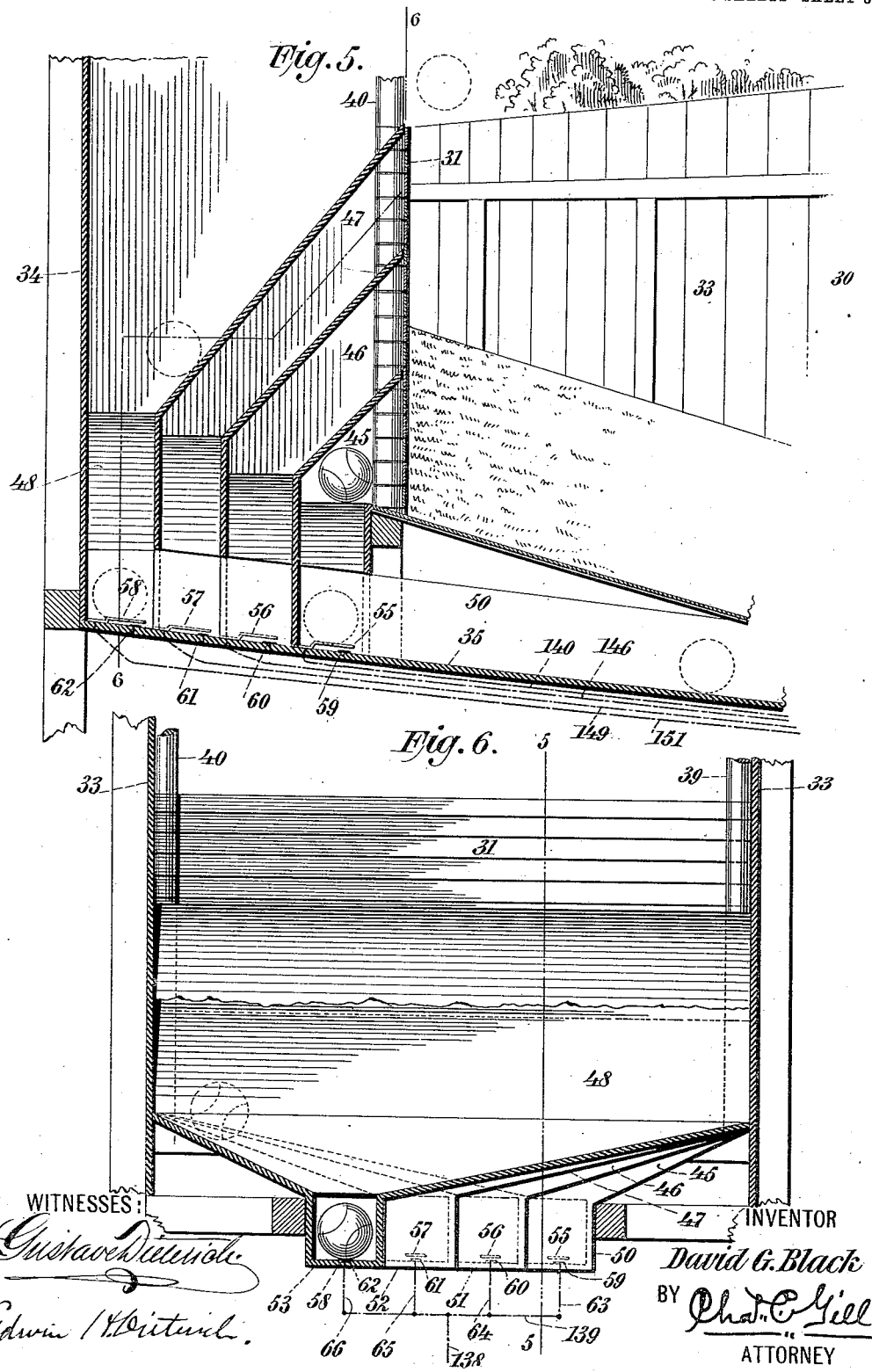

No. 856,216. PATENTED JUNE 11, 1907.
D. G. BLACK.
GAME APPARATUS.
APPLICATION FILED FEB. 15, 1907.
8 SHEETS—SHEET 4.
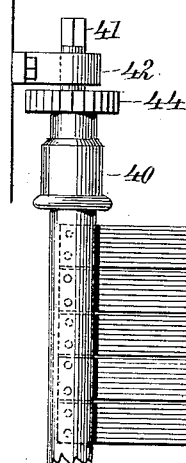
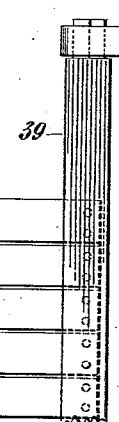
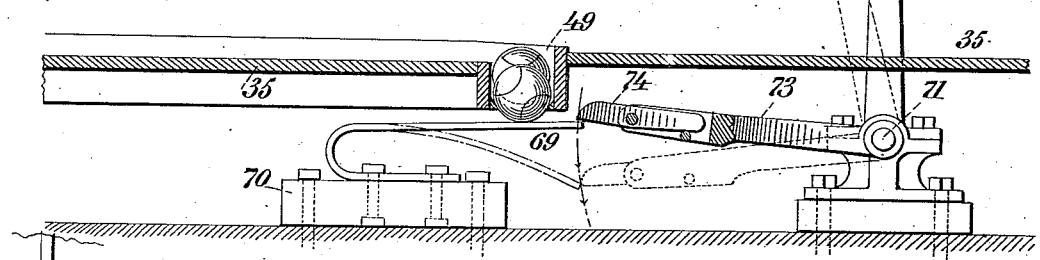
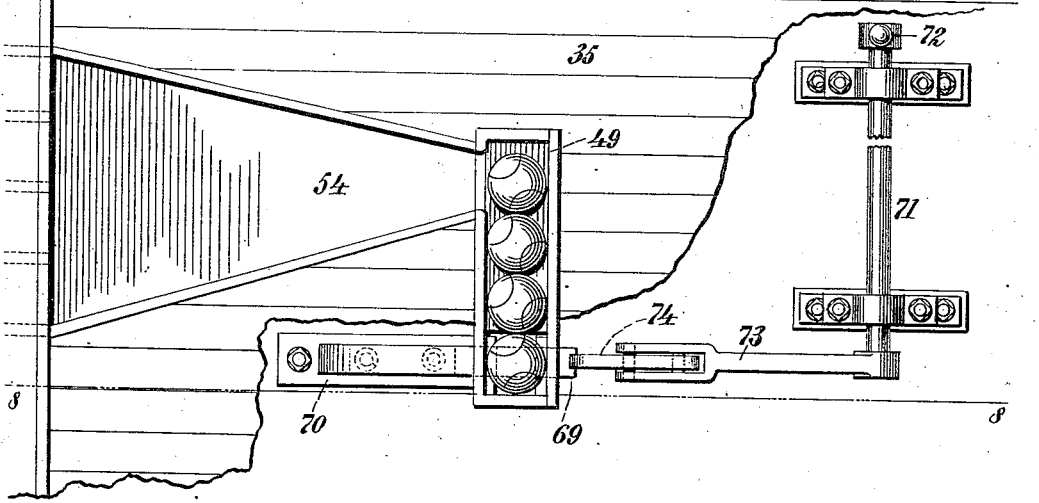
WITNESSES:
Gustave Dieterich
Edwin H. Dieterich
INVENTOR
David G. Black
BY Chas. C. Gill
ATTORNEY No. 856,216. PATENTED JUNE 11, 1907.
D. G. BLACK.
GAME APPARATUS.
APPLICATION FILED FEB. 15, 1907.
8 SHEETS—SHEET 6.
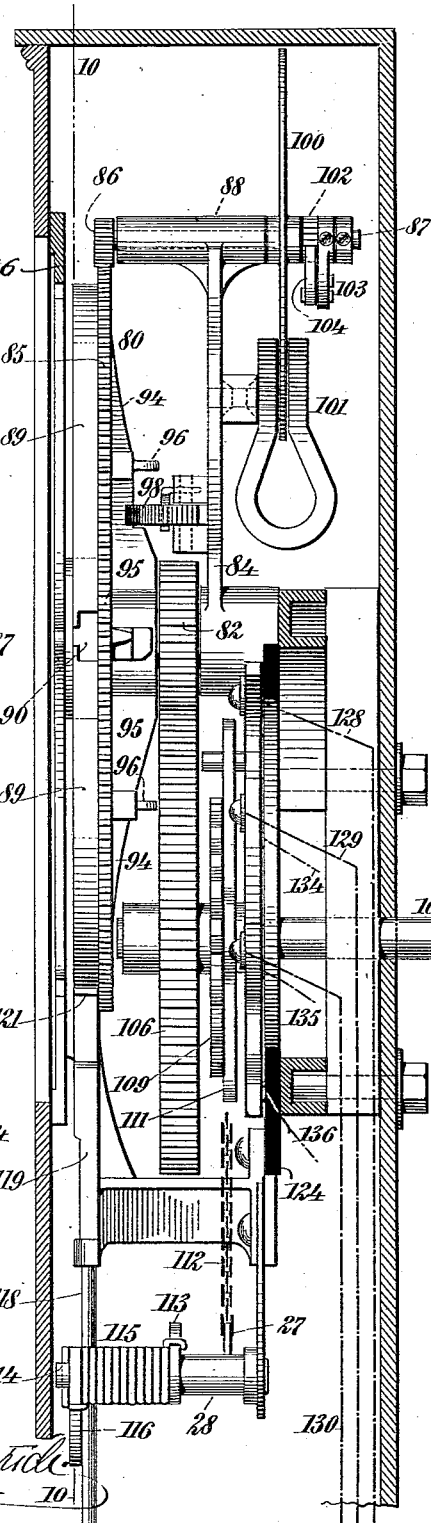
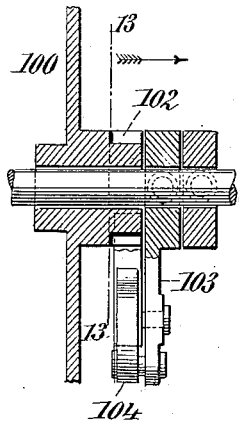
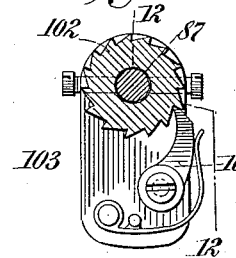
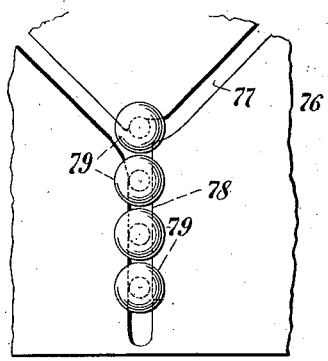
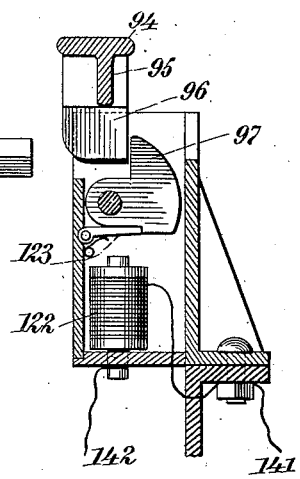
WITNESSES:
Gustave Dieterich
Edwin H. Dieterich
INVENTOR
David G. Black
BY Chas. C. Gill
ATTORNEY No. 856,216. PATENTED JUNE 11, 1907.
D. G. BLACK.
GAME APPARATUS.
APPLICATION FILED FEB. 15, 1907.

8 SHEETS—SHEET 7.

WITNESSES:
Gustav Dieterich
Edwin H Dieterich

INVENTOR
David G. Black
BY Chas. C. Gill
ATTORNEY

No. 856,216. PATENTED JUNE 11, 1907.
D. G. BLACK.
GAME APPARATUS.
APPLICATION FILED FEB. 15, 1907.
8 SHEETS—SHEET 8.
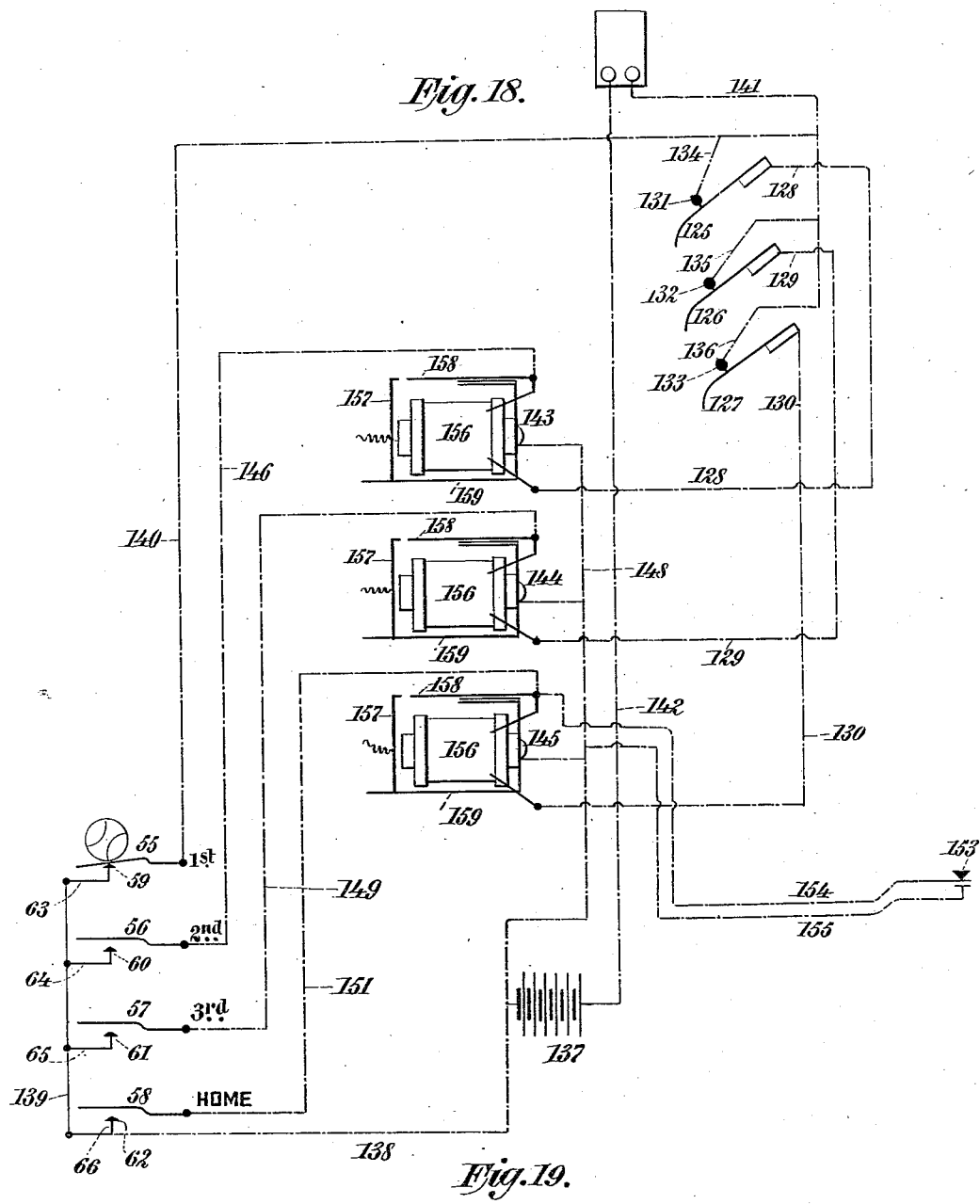
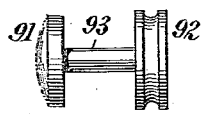
WITNESSES:
INVENTOR
David G. Black
BY
ATTORNEY

UNITED STATES PATENT OFFICE.

DAVID G. BLACK, OF BROOKLYN, NEW YORK.

GAME APPARATUS.

No. 856,216.　　　　　Specification of Letters Patent.　　　Patented June 11, 1907.

Application filed February 15, 1907. Serial No. 357,475.

*To all whom it may concern:*

Be it known that I, DAVID G. BLACK, a citizen of the United States, and a resident of Brooklyn, in the county of Kings and State of New York, have invented certain new and useful Improvements in Game Apparatus, of which the following is a specification.

The invention relates to improvements in game-apparatus, and consists in the novel features, mechanism and combinations of parts hereinafter described, and particularly pointed out in the claims.

The object of the invention is to provide a novel, suitable, attractive and efficient apparatus with the use of which a game representative of a game of base-ball may be played, the players batting the ball and the runs on the diamond being performed by buttons or figures representing the players and traveling one or more bases or making home-runs in accordance with the location to which the balls may be driven when batted.

The apparatus of my invention comprises generally (1) means for projecting or tossing a base-ball upwardly in position for it to be struck by a bat in the hands of a player, (2) a target through or over which the player will seek to drive the ball, (3) an indicator bearing a representation of a diamond field with the mechanism hereinafter described for causing buttons or figures to travel from base to base on said diamond in accordance with the game-value of the batted balls, and (4) electrical means to be rendered active by the batted balls for controlling the operation of the indicator mechanism and the runs to be made by the representative players.

I preferably provide as a part of the apparatus a chamber at the front of which will be the batter's position and at the rear end of which will be arranged the target at or at an open space above which the players will seek to drive the ball, and the floor and sides of said chamber will preferably be painted to represent in an illusionary manner a base-ball field of somewhat natural proportions. The indicator and its inclosed mechanism will preferably be located near the front of the target-chamber where it may be conveniently observed, and said indicator mechanism will be connected in a series of electric circuits, normally broken, one of which will be closed by the ball each time it passes through or over the target, by said ball falling upon and depressing a contact located at the rear end of said chamber. There are four electric contacts at the rear of the target-chamber respectively representing first-base, second-base, third-base and home-run, and independent chutes are provided to receive the ball after it passes beyond the target and direct it to one of said contacts. I also provide means for returning the balls whether they pass through or over the target or merely strike the walls of the target-chamber, to a suitable receiver at the batter's position.

The novel features of my invention reside more particularly in the diamond-indicator and its mechanism, the means for electrically controlling the operation of said mechanism and enabling the batted ball in accordance with its game-value to establish the appropriate circuit for permitting said mechanism to operate, and the means for returning the batted balls to the batter's position in front of the target-chamber.

The invention will be fully understood from the detailed description hereinafter presented, reference being had to the accompanying drawings, in which:—

Figure 10:
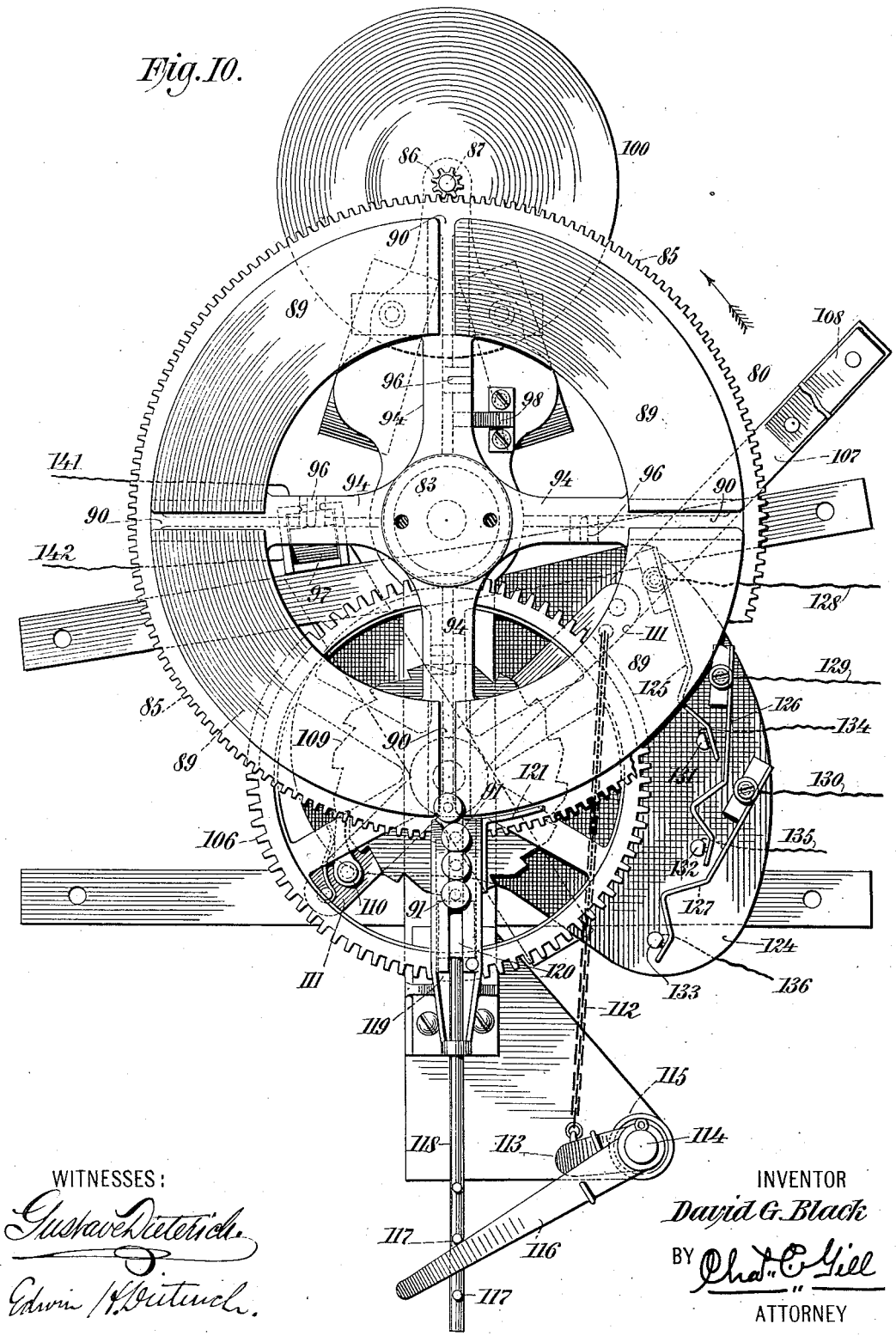
Figure 16:
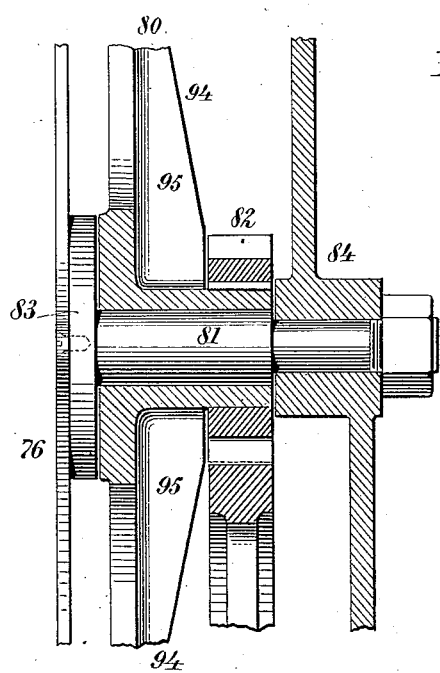
Figure 17:
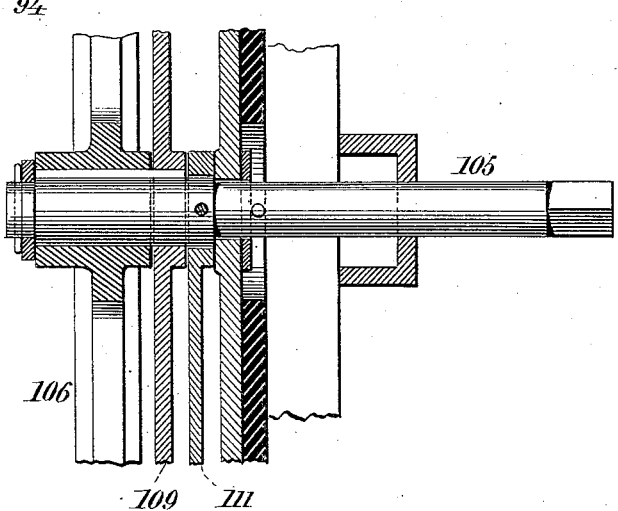

Figure 1 is a front elevation, partly in perspective and partly broken away, of a game-apparatus embodying my invention, this figure mainly representing the target-chamber denoting in an illusionary manner a base-ball field, and the means for returning the batted balls to and receiving them at the batter's position in front of said chamber; Fig. 2 is a central vertical longitudinal section of the same on the dotted line 2—2 of Fig. 1; Fig. 3 is a detached side elevation of the upper portion of one of the posts to which one end of the target, which is composed of strips of fabric, is secured; Fig. 4 is a sectional view of the same on the dotted line 4—4 of Fig. 3; Fig. 5 is an enlarged vertical longitudinal section, partly broken away, of the rear portion of the chamber and its cooperating parts, the section being taken on the dotted line 5—5 of Fig. 6; Fig. 6 is a transverse section through a portion of the rear part of the chamber and its cooperating parts on the dotted line 6—6 of Fig. 5; Fig. 7 is an enlarged detached face view of a portion of the target disposed at the rear end of the chamber; Fig. 8 is an enlarged longitudinal section, corresponding substantially with Fig. 2, illustrating the apparatus for tossing the ball upwardly preparatory to the batting of the same, the section being on the dotted line 8—8 of Fig. 9; Fig. 9 is an enlarged top view, partly broken away, of the flooring in front of the chamber and illustrates the return runway for the base balls and the means for tossing them upwardly preparatory to their being batted; Fig. 10 is a face view of the mechanism by means of which the figures on the indicator diamond, denoting the scores made by the batters, are caused to travel from base to base, the outside casing and the diamond indicator plate represented in Figs. 1 and 2 being omitted from Fig. 10; Fig. 11 is a side elevation, partly in section, of same, the casing of the indicator with its diamond indicator plate representing bases being shown in position and partly in section; Fig. 12 is a vertical section on the dotted line 12—12 of Fig. 13 of the ratchet mechanism illustrated by the upper right hand portion of Fig. 11; Fig. 13 is a vertical transverse section of the same on the dotted line 13—13 of Fig. 12; Fig. 14 is an enlarged detached front view of the lower portion of the indicator-diamond, with the buttons or travelers representing the players ready for use in playing the game, the top button or traveler being shown as being in the batter's position; Fig. 15 is an enlarged vertical section through the lock-mechanism for directly controlling the rotation of the disk by which the buttons or travelers are caused to move along the indicator-diamond; Fig. 16 is an enlarged central vertical section through a portion of the large disk which effects the travel of the buttons along the indicator-diamond, with its axle and coöperating parts; Fig. 17 is a like section through the lower or operating shaft of the interior mechanism for the indicator-diamond; Fig. 18 is a diagrammatic view illustrating the electric circuits by which in connection with the mechanism shown in Fig. 10, the travel of the buttons around the indicator-diamond is effected and controlled, and Fig. 19 is a side elevation of one of the buttons or travelers which on the indicator represent the players.

In the drawings, 30 designates the chamber into which the balls are to be batted and at the rear end of which is located the target 31 composed of strips of woven fabric, such as commonly used for belting. The chamber 30 is formed by a frame-work of any suitable character having a top 32, sides 33, a rear end 34, a base flooring 35 and an upper flooring composed of sections 36, 37 which incline frontwardly and downwardly and are separated at their adjoining ends by a space 38 (Fig. 2) extending transversely across the chamber 30 and through which a ball falling upon the rear floor section 36 may pass and be thence directed frontwardly to the receiver for balls to be batted. The floor-sections 36, 37 and a portion of the vertical surfaces of the target 31 and sides 33 are painted to represent in an illusionary manner a baseball field surrounded by a fence, with scenery beyond the upper edge of the fence, in somewhat natural proportions, as shown in Figs. 1, 2 and 5. The target 31 does not extend upwardly to the roof of the chamber 30, and upon the face of the rear end 34 of said chamber where it projects above the plane of said target is painted scenery to add to the illusionary effect presented by the chamber. The walls of the chamber 30 converge rearwardly as indicated in Figs. 1 and 2, which aids in imparting to the chamber the effect of considerable depth.

The target 31, composed of strips of fabric in edge to edge relation to one another, is secured at its ends to posts 39, 40, one of which is mounted to be rotated by means of a key to be applied to its upper polygonal end 41 (Figs. 2, 3 and 4). The upper end of the post 40 is held within a suitable bearing 42 upon which is secured a spring-pawl 43 adapted to engage a ratchet wheel 44 secured upon the post 40. The post 40 will be rotated to wind one end of the target 31 upon it when it is desired to increase the tension of the target or remove slackness from it, and the pawl 43 and ratchet 44 serve to lock the post 40 against rotation in a reverse direction. When a driven ball strikes the target 31 composed of the independent strips of woven fabric it forces its way between said strips, the latter when struck by the ball twisting or turning axially to a sufficient extent to permit the ball to pass between them. The strips are held taut and being of woven fabric will twist or turn on their longitudinal axes between their ends when struck by a ball and permit the latter to pass through, and said strips also yield rearwardly to some extent when struck by a ball and this facilitates the passage of the ball between them.

Between the target 31 and rear end 34 of the chamber are arranged three chutes, of hopper shape, designated 45, 46 and 47 respectively, and outwardly beyond the chute 47 is formed a chute 48, the end 34 constituting the outer wall of this chute 48. The upper portions of the chutes 45, 46 and 47 incline forwardly to the rear surface of the target 31 and extend from one end to the other of said target, and the mouths of said chutes 45, 46, 47 are disposed one above the other so as to define definite fields of the target 31, the chute 45 defining a section of the target 31 representative of first base and adapted to receive a ball passing between the strips of the target within the outline of the open mouth of said chute 45, the game value of the ball passing into the chute 45 entitling the player to a first base run. The mouth of the chute 46 is against a middle section of the target 31 and is adapted to receive a ball passing through the said section, that is between the strips thereof, and a ball driven into the chute 46 would entitle the batter to a run to second base. The mouth of the chute 47 covers the upper portion of the target 31 and a ball driven through the target and into said chute 47 would entitle the batter to a run to third base. A ball batted over the target 31 and falling into the chute 48 would entitle the player to a home run. The chutes 45, 46, 47, 48 are therefore differently disposed so that the batters may exercise skill in driving the ball to locations of the highest game value. A ball driven into the chamber 30 and not passing either through or over the target 31 would be regarded as a foul, and such ball if falling upon the rear floor section 36 would roll down the same and through the space 38 and finally reach the receiver 49 at the front of the chamber, while if such ball should fall upon the front section 37 of the flooring it would roll down the same and fall upon the frontwardly extending portion of the main flooring 35.

The chutes 45, 46, 47, 48 have separate discharge spouts, as shown in Fig. 6, leading downwardly to a series of troughs 50, 51, 52, 53 respectively, (Figs. 1 and 6), which incline downwardly and frontwardly and lead into a general trough 54 at the front of the chamber 30 (Fig. 1) by which the balls are guided to the receiver 49 located at the batter's position. The troughs 50, 51, 52 and 53 extend below the floor sections 36, 37 and their bottom is formed by the main floor section 35 (Figs. 2 and 5).

At the rear ends of the troughs 50, 51, 52 and 53 and just below the discharge spouts from the several chutes 45, 46, 47, 48 are arranged spring contacts 55, 56, 57, 58 respectively upon which the balls passing into the chutes will descend and close the circuits connected with said contacts before they roll down the said troughs to the front of the chamber. The spring contacts 55, 56, 57, 58 are in the nature of small spring plates located directly above plates or posts 59, 60, 61, 62 from which wires 63, 64, 65, 66 respectively, pass and coöperate with other wires in forming electric circuits leading to the casing 67 of the diamond-indicator 68, hereinafter described. When a ball falls upon one of the contacts 55, 56, 57, 58 it will depress the same against a post or plate 59, 60, 61 or 62, as the case may be, and close a circuit extending therefrom in the manner hereinafter described and as more clearly illustrated in Fig. 18, whereby the mechanism within the casing 67 will be allowed to operate to an extent governed by the game-value of the ball which closes the circuit at the rear end of the chamber 30. The arrangement of the electric circuits will be described in detail hereinafter, it being intended more particularly to describe at this place the mechanical features of the apparatus. It may be said, however, that the balls falling downwardly through the chutes 45, 46, 47, 48 only remain momentarily upon the spring contacts 55, 56, 57, 58 and then immediately roll down the troughs 50, 51, 52, 53 to the general front trough 54 preparatory to being used again. Foul balls falling upon the floor section 37 roll down the same and fall upon the forwardly extending portion of the main floor 35, and said balls must be picked up and dropped into the trough 54 or receiver 49. It has been described above that foul balls falling upon the rear floor section 36 pass through the opening 38 intermediate the rear and front floor sections 36, 37, and these balls, unless they roll directly into one of the troughs 50, 51, 52, 53, are, by means of converging strips of boarding 67, 68 (Fig. 1) directed to the main receiving trough 54, the strips 67, 68 converging frontwardly and directing the ball into one of the troughs 50, 53, the lower edge of the strips 67, 68 being on a plane with the upper edge of said troughs.

The receiver 49 constitutes simply a transversely elongated receptacle at the batter's position and whose left hand end, looking at Fig. 1, is open at its bottom for a width a little greater than the diameter of a baseball, so that the ball rolling to the left hand end of said receiver may drop slightly and rest upon the free end of the bar-spring 69 (Fig. 8) secured upon a block 70 below the flooring 35. At the front of the receiver 49 is mounted a shaft 71 provided at one end with an operating handle 72 and at its other end with a crank arm 73 which projects rearwardly below the flooring 35 and is equipped with a weighted pivoted arm 74 whose outer end normally projects rearwardly upon the forward end of the spring 69. The purpose of the spring 69, shaft 71, handle 72 and arm 74 is to afford adequate means for tossing the ball located upon the spring upwardly into position to be struck by a bat in the hands of a player at the batter's position, so that said ball may be driven into the chamber 30 toward the target 31. When it is desired to toss the ball resting upon the spring 69 upwardly, an attendant will throw the handle 72 rearwardly to the position indicated by dotted lines in Fig. 8 and thereby cause the crank arm 73 and pivoted arm 74 to flex the spring 69 downwardly, the movement of the handle 72 continuing until the end of the spring 69 slips from the end of the arm 74, at which time the said spring will quickly return to its upward position and eject the ball upwardly from the receiver 49. Upon the left hand ball being projected upwardly from the receiver 49 the next adjacent ball in said receiver will roll into position upon said spring, and the attendant will restore the handle 72 to its normal position shown by full lines in Fig. 8, the toe of the arm 74 turning downwardly as the said arm passes the end of the spring 69 and thereafter, due to the weighted end of said arm, turning upwardly so that it may pass into the position shown in Fig. 8 above said spring, preparatory to the further operation of tossing a ball upwardly for the next player. The spring 69, shaft 71, handle 72, crank arm 73 and weighted arm 74 constitute simply one convenient means for projecting the ball upwardly into position to be struck by the batter, and my invention is not confined to the special mechanism shown for accomplishing this purpose since various mechanisms may readily be devised for effecting the upward movement of the ball. I do, however, regard it as important and novel with me, in an apparatus of the character described, to provide the series of troughs 50, 51, 52 and 53 leading into the main trough 54 which conducts the return balls to the receiver 49 adapted to automatically locate the ball to be used directly upon the means by which the ball is to be projected upwardly. The shaft 71, looking at Fig. 1, should be extended to the right a suitable distance to enable the attendant to operate the handle 72 without danger of being struck by a bat in the hands of a player standing at the batter's position adjacent to the receiver 49, and I therefore show the shaft 71 as being broken.

The mechanism controlled by the electric circuits and confined within the upper portion of the casing 67 of the diamond-indicator 68 is illustrated more clearly in Figs. 10 to 15 inclusive. The front of the casing 67 is, however, illustrated in Fig. 2, wherein it may be seen that the lower portion of the casing is provided with a door 75 which closes a compartment which may be used for holding the batteries for the electric circuits and the base balls when the latter are not in use. The upper portion of the casing 67 forms a chamber within which is confined the operating mechanism shown in Figs. 10 and 11, and the face-plate 76 of which, preferably of non-corrosive metal, is formed with a diamond slot 77 representative of the diamond of a baseball field and being continuous and leading from a slot 78 within which will be initially located the buttons or travelers 79 (Fig. 14) representative of the players, and which buttons or travelers are caused to traverse the slot 77 from base to base and finally return to the home slot 78. In Fig. 14 I illustrate three of the travelers 79 in the home slot 78 and one traveler, this being the one in play, ready to travel along the slot 77 toward first base. In Fig. 2 I illustrate the traveler 79 as being distributed upon the bases, one traveler being on first-base, one on second-base, one on third-base and one at the home-base ready to move along the slot 77, upon a ball being driven through or over the target 31 and completing one of the electric circuits permitting the mechanism shown in Figs. 10, 11, to operate.

Directly in rear of the face-plate 76 of the diamond-indicator is mounted a wheel 80 which is utilized during its rotation as the means for compelling the buttons or travelers 79 to follow the angular course defined by the diamond slot 77. The wheel 80 is mounted upon an axle 81 (Fig. 16) and has keyed to it a pinion wheel 82 so that motion may be imparted through the wheel 82 to the wheel 80 while the axle 81 remains stationary. Upon the front end of the axle 81 is a disk 83, to which is rigidly fastened that portion of the face-plate 76 which is bounded by the slot 77. The axle 81 is mounted in a rigid portion 84 of the framing for supporting the general operative mechanism and the details of which are unimportant. Upon the periphery of the wheel 80 is provided the gear teeth 85 to engage a pinion wheel 86 secured upon the front end of a shaft 87 which is mounted in a sleeve 88 (Fig. 11) carried by the rear frame 84. The purpose of the gear wheel 86 and shaft 87 will be hereinafter explained. The wheel 80 is provided primarily to effect the travel of the buttons 79 from base to base along the diamond slot 77, and upon the front face of the wheel 80 are formed four segmental portions 89 at whose adjoining ends are formed undercut slots 90 (Figs. 10 and 11) into which the buttons 79, at their inner ends, pass and back and forth along which said buttons may move during the rotation of the wheel 80 carrying said buttons along the angular course of the diamond slot 77. The buttons 79 formed, as shown in Fig. 19 with an outer head 91, an inner head 92 and a connecting neck 93, and during the period that a button is engaged by the wheel 80, the inner head 92 of the button is held freely within one of the slots 90 and the outer head 91 of the button is exposed upon the outer face of the angular or diamond slot 77 (Fig. 2), while the neck 93 connecting said outer and inner heads traverses the space formed by the thicknesses of material in the face-plate 76 and the edges of the adjoining ends of the segments 89 as well as the space left for clearance between the outer face of said segments and the inner face of the plate 76.

The wheel 80 contains four of the undercut slots 90 and in the normal stationary condition of the mechanism these slots will be in line with the bases or corners of the diamond-slot 77 in the face-plate 76, and after each rotary movement of the wheel 80, whether a run of one or more bases is to be shown on the diamond-indicator 68, the wheel will come to a rest with its slots 90 in their normal position in line with the bases or corners of the diamond slot 77.

The wheel 80 has four spokes 94 and these spokes are preferably in line with the slots 90 and have rearwardly extending webs or flanges 95 upon which are lugs 96 to be engaged at the proper time, by a pivoted latch 97 (Fig. 15) for arresting the wheel 80 at a point at which the slots 90 thereof will stand in line with the corners of the diamond slot 77.

Upon the supporting frame 84 is pivotally secured a spring dog 98 which operates to prevent any reverse movement of the wheel 80 after said wheel becomes arrested by the latch 97, said dog 98 thus aiding in maintaining the wheel 80 when it comes to a stop with its slots 90 directly in line with the corners or bases of the diamond slot 77 and with the lower one of said slots 90 in direct alinement with the home slot 78 formed in the face-plate 76 below said diamond-slot 77, so that the buttons or travelers 79 located in said home-slot may, when pressed upwardly therefrom to the position in which the upper one of said buttons or travelers is shown in Fig. 14, enter the then lower undercut slot 90 and also have its neck portion carried into the slot 77 at the batter's position. In Fig. 10 I illustrate one of the buttons or travelers 79 as having been moved upwardly into the lower slot 90 of the wheel 80, while the remaining buttons are below said slot. The dog 98 during the rotation of the wheel 80, toward the left, yields to the spokes 94 of the wheel, each spoke turning the dog inwardly as it passes over the same, and the spring connected with said dog restoring the same outwardly to its normal position immediately after each spoke passes over it. The wheel 80 having the slots 90 is therefore utilized for effecting the travel of the buttons 79 along the representative diamond field indicated by the slot 79 in the face-plate 76 of the diamond indicator 68, and said wheel 80 is given an intermittent controlled motion, making either a part of a rotation or an entire rotation in accordance with the score earned by the batted ball. The wheel 80 cannot start in rotation until the latch 97 is, by the means hereinafter described, caused to release it, and it only continues in rotation during the time that the latch 97 is out of engagement with the lugs 96 carried by the wheel. The means for rotating the wheel 80 will presently be described, and since the gear teeth 85 and pinion wheel 86 have been hereinbefore referred to, it may be mentioned at this place that the shaft 87 carrying said pinion wheel 86 also carries a disk 100 whose outer portions pass between the poles of a magnet 101, the latter with the disk 100 constituting a magnetic drag or brake for controlling the movement of the wheel 80 and compelling said wheel to have a timed rotation and the buttons or travelers 79 a controlled movement from base to base. The teeth 85 on the wheel 80 by engaging the pinion wheel 86 causes the shaft 87 carrying the disk 100 to have a rapid movement between the poles of the magnet 101, whose magnetic force acts to retard the rotation of said disk 100 and shaft 87 and thereby control the movement of the wheel 80. When the wheel 80 is brought to a stop by the contact of one of its lugs 96 with the latch 97 it is desirable, so as to avoid danger of breaking the teeth 85 or those of the pinion wheel 86, that the disk 100 may continue in motion for a limited period, so as to expend its momentum, without acting against or tending to actuate the said pinion wheel 86, and to permit this result I mount the disk 100 loosely upon the shaft 87 and provide the same with an integral ratchet wheel 102 (Figs. 11, 12, 13), and secure upon the shaft 87 an arm 103 carrying a spring pawl 104 to engage said ratchet wheel. During the rotation of the shaft 87 from the large wheel 80 the pawl 104 engaging the ratchet 102 will compel the rotation of the disk 100 with said shaft, and when the wheel 80 is brought to a stop and the plate 103, pawl 104 and shaft 87 are thereby arrested, the disk 100 may continue in motion, the ratchet wheel 102 then sliding its teeth over the point of the pawl 104. In the absence of the pawl 104 and ratchet 102 and if the disk 100 were secured to the shaft 87, said disk, due to its momentum, would, upon the stoppage of the wheel 80, likely wrench or break the teeth of the pinion wheel 86 or the teeth 85, but by providing means for allowing the disk 100 to continue in motion after the wheel 80 is brought to a stop, the liability of straining the teeth of the pinion wheel 86 or of the wheel 80 is avoided.

The wheel 80 receives its motion from the power shaft 105 through the gear wheel 106 mounted thereon and pinion wheel 82, the latter, as hereinbefore described, being keyed to said wheel 80; and said power shaft 105 receives its motion, when it is released to rotate, from a weighted arm 107 secured upon the polygonal inner end of said shaft and normally extending upwardly and outwardly, as indicated in Fig. 10, so that when said shaft 105 is released to rotate, the weight of said arm will cause the latter to turn downwardly at its outer end and effect, as by a crank motion, the rotation of said shaft 105 and through it and the gear wheel 106 and pinion 82, the movement of the large wheel 80, said shaft 105 and said wheel 80 only remaining in motion during the descent of the weighted arm 107 and ceasing to rotate the moment said arm 107 ceases its movement. Upon the outer end of the arm 107 I provide a suitable weight 108 to effect the downward movement of said arm. The gear wheel 106 is loose on the shaft 105, but during each descending movement of the arm 107 becomes locked thereto by means of the ratchet wheel 109, pawl 110 (Fig. 10) and arm 111 to which said pawl is pivotally secured and which is fastened to the shaft 105 by means of a pin or otherwise, as shown in Fig. 17. When the arm 107 descends to turn the shaft 105, this action causes the arm 111, fastened to said shaft to carry the pawl 110 upwardly against the ratchet wheel 109, the latter being thereby caused to rotate and to impart its movement to the gear wheel 106 to which it is keyed, as shown in Fig. 17. After the arm 107 has descended to the proper extent, which is controlled by the electric current in connection with the latch 97, the attendant will manually push the outer end of said arm upwardly to its initial position indicated in Fig. 10, and during this resetting of the arm 107 the shaft 105 and arm 111 will have a reverse movement back to their former position, the pawl 110 at this time slipping downwardly over the teeth of the ratchet wheel 109 without actuating said wheel, the purpose being to reset the arm 111 and parts connected therewith without, during the resetting of the arm 107, imparting any movement to the gear wheel 106 or large wheel 80. The gear wheel 106, pinion wheel 82 and large wheel 80 rotate during the downward movement of the arm 107 and remains stationary during the upward or resetting movement of said arm.

The arm 111 has connected to its upper end a chain or flexible connection 112 whose lower end is secured to an arm 27 integral with a sleeve 28 loosely mounted upon a pin 114 and having an integral arm 113 parallel with said arm 27, said pin 114 being carried by a portion of the frame-work for the general mechanism, as shown in Figs. 10 and 11. Upon the pin 114 is a coiled spring 115, one end of which is bent over and thereby placed in engagement with the upper edge of the arm 113, while the other end of said spring is bent under and placed in engagement with the lower edge of an arm 116 which is pivotally mounted upon the outer end of said pin 114 and extends laterally between projections 117 secured to a vertical rod 118 which extends upwardly within a vertical guide-way 119 for the buttons or travelers 79. The guide-way 119 is of box formation having a vertical slot in its outer face and being adapted to receive the inner heads 92 of the buttons or travelers 79, while the outer heads 91 of said buttons project outwardly beyond said guide-way and are in the assembled machine, at the outer side of the diamond-indicator face-plate 76, as shown in Fig. 14, in which said buttons are illustrated as located in the slot 78 which is directly in front of and in line with the slot in the face of said guide-way 119. Upon the upper end of the rod 118 is provided a head or follower 120 which engages the lower one of the buttons 79 and is utilized at the proper time for pressing the upper button into the lower corner of the diamond slot 77, as shown in Figs. 10 and 14, and to continue to press said buttons, one after another, into said corner of said slot, as the buttons are, one after another, caused to travel from base to base or corner to corner of said slot.

The upper end of the guide-way 119 is the front of the gear teeth 85, as shown in Fig. 11, and supports a segmental foot 121 which is close to the periphery of that portion of the wheel 80 formed by the segments 89. The mouth at the upper end of the guide-way 119 leads directly into one of the undercut slots 90 of the wheel 80 so that the buttons held in the said guide-way, when pressed upwardly by the follower 120 on the rod 118, may enter a slot 90 of said wheel. When a button is pushed upwardly by the follower 120 into a slot 90 of the wheel 80 it will, as shown in Fig. 14, become arrested by the lower corner of the face-plate 76, said corner being slightly cut away at its right hand side to form a bearing for the neck of the buttons pressed against it and the cut away portion leaving a recess which opens toward the right directly into the slot 77, so that upon the movement of the wheel 80 the top button may readily enter and be carried along said slot, the button during its passage along the diamond-slot 77, which is angular, necessarily moving inwardly and outwardly along its carrying slot 90 so that it may, while carried upon a circular wheel, follow the angular outline of the diamond field.

The spring 115 is under tension when the arm 111 is in its upper normal position, shown in Fig. 10, the length of the chain 112 being such that the upward movement of the arm 111 takes all of the slack out of said chain and draws said chain upwardly to a limited extent to effect an upward movement of the arms 113 and 116 connected with said spring, the arm 113 turning upwardly and acting through the spring 115 to turn the arm 116 upwardly against the resistance offered by one of the projections 117 on the rod 118, as shown in Fig. 10, this resistance to the movement of the arm 116 creating a tension in the spring 115 which tension is exerted against the rod 118 and through said rod against the buttons or travelers 79. The purpose of applying the spring pressure to the rod 118 is to cause the upper button or traveler 79 to pass from the slot 78 of the face-plate 76 and guide-way 119 into the undercut slot 90 which may become stationary above said guide-way. The lever arm 116 is of considerable length and hence with but a limited movement of the short arm 113, ample spring pressure may be exerted against the rod 118 to cause it to follow up the guide-way 119 and press into the lower slot 90 of the wheel 80 all of the buttons or travelers 79, one after another, as said buttons are carried along the diamond slot 77. When, during the operation of turning the wheel 80, the arm 111 moves downwardly with the actuating arm 107, the chain 112 becomes slackened and relieves the spring 115 from all tension, under which tension the arms 113 and 116 drop downwardly and with them the rod 118 drops downwardly from the buttons or travelers 79, this being for the purpose of preventing any pressure of the buttons or travelers against the periphery of the wheel 80 while the latter is in motion carrying a button or buttons from base to base along the diamond slot 77. If the spring pressure were continued against the rod 118 at all times, the line of buttons or travelers 79 would remain constantly pressed against each other and against the periphery of the wheel 80, which would be undesirable, and therefore I provide mechanism for preserving the spring tension against the rod 118 and buttons or travelers 79 only during the period that the wheel 80 is stationary, and relieving such tension from said rod as soon as the wheel 80 starts in motion. I provide the shoe 121 at the right of the upper end of the guideway 119 so that by no possibility may a button or traveler 79, when starting on its course along the diamond slot 77, sag below the lower end of the slot 90 carrying it.

It will be understood from the foregoing description that the wheel 80 is actuated from the driving shaft 105 through the arm 111, ratchet wheel 109, pawl 110, gear wheel 106 and pinion wheel 82, the latter being keyed to said wheel 80, and that said shaft 105 is set in motion by the turning downwardly of the weighted arm 107, the movement of this arm imparting rotation to said shaft. It will also be understood that the wheel 80 and through it, the shaft 105 and arm 107 are held stationary, except when definitely operated, by means of the pivoted spring latch 97 (Fig. 15) held in engagement with one of the lugs 96 on the spokes 94 of the wheel 80.

The pivoted latch 97 always holds the wheel 80 and the other parts of the mechanism in a stationary condition except when a ball passing through or over the target 31 descends upon one of the spring contacts 55, 56, 57, 58, and thereby completes an electric circuit leading to the indicator casing 68 and energizing the magnet 122 (Fig. 15) for the purpose of causing the latter to draw toward it the spring armature 123, which normally holds the latch 97 in the path of the lugs 96 of the wheel 80, but which, when drawn to the electro-magnet 122, allows said latch, by gravity, to turn downwardly out of the path of said lugs 96, thereby freeing the wheel 80 and permitting the weighted arm 107 to turn downwardly and through the shaft 105 and intermediate connections, rotate the wheel 80 to an extent governed by the length of time the magnet 122 retains the armature 123, and the latch 97 remains out of the path of the lugs 96 of said wheel. The period of rotation of the wheel 80 permitted by the electric circuits is governed by the game-value of the ball batted, that is whether it entitles a player to a run to first-base or to second-base or to third-base or to a home-run. While the circuit remains unbroken through the electro-magnet 122, the latter will retain the armature 123 and the latch 97 will remain out of the path of the stop-lugs 96 on the wheel 80, and hence I provide means which, during the rotation of the wheel 80, breaks the circuit through the electro-magnet 122 in accordance with the game-value of the ball batted, commencing with the batting of a ball entitling the player to a run to second-base. For a first-base hit the circuit through the electro-magnet 122 is maintained only just long enough for one spoke of the wheel 80 to pass the spring latch 97, said circuit being immediately thereafter broken (by the ball rolling off from the spring contact 55) and the magnet 122 permitting the armature 123 to restore the latch 97 to its operative position, so that upon the succeeding spoke of the wheel arriving at the latch, the latter will engage the same and stop the wheel, the wheel then having turned a sufficient distance to carry the upper traveler or button 79 from the home-base position along the diamond slot 77 to first-base position. When, however, a batted ball entitles the player to a run beyond first-base, say to second-base, the latch 97 must remain out of the path of the stop lugs 96 of the wheel 80 until at least two spokes of said wheel have passed said latch, whereupon the latch may return to its engaging position so as to catch the third spoke of the wheel, the wheel then having been permitted, in its one-half rotation, to carry a button or traveler 79 from the home-base position to the second-base position and the traveler or button previously on the first-base having by this operation, reached the third-base position. In the event of the game-value of a batted ball entitling a player to a run to third-base, the circuit must be maintained through the electro-magnet 122 long enough for the latch 97 to remain out of the path of the stop lugs 96 until three spokes pass said latch, so that a button or traveler 79 may be carried from the home-base position around to the third-base position, the wheel 80 becoming arrested at that point (upon completing a three-quarter rotation) by the breaking of the circuit through the electro-magnet 122 and the return of the latch 97 into position to stop said wheel. If a batted ball should entitle the player to a home-run, the electric circuit through the magnet 122 must be maintained long enough for the wheel 80 to perform a complete rotation, thereby permitting it to carry a traveler or button 79 from the home-base position entirely around the diamond slot 77 and back to said position, all buttons or travelers 79 on the bases at the time of this run being, one after another, carried to the home-base position and dropping into the slot 78, the spring rod 118 then being in its lower position and permitting said buttons to automatically descend, one after another, into said slot. Owing to the relative proportions of the gear wheels 106 and 82, a limited movement of the weighted-arm 107 and shaft 105 is enabled to effect a complete rotation of the wheel 80.

The means I provide for breaking the circuit through the electro-magnet 122 so that the wheel 80 may become arrested at different periods of its rotation in accordance with the game-values of the batted balls, are shown in Fig. 10, in which it may be observed that upon a plate 124 of insulating material, I secure three springs 125, 126 and 127, respectively, said springs at their fastened ends being respectively in electrical connection with conductors 128, 129 and 130 and at their free ends being normally flexed against posts 131, 132 and 133, respectively, which are in electrical connection with conductors 134, 135 and 136, respectively.

The springs 125, 126 and 127 are normally in electrical connection with the posts 131, 132 and 133, respectively, and the circuits are formed through these respective springs in accordance with the game-value of the batted ball at all times when said value is above that of a run to first-base, and the circuits are broken at said posts 131, 132, 133, respectively, so as to deënergize the magnet 122 and permit the spring latch 97 to regain its position for stopping the wheel 80 after said latch has remained out of its operative position long enough to permit the wheel 80 to perform its proper movement in accordance with the game-value of the batted balls.

Upon the batting of a ball and the energizing of the magnet 122 by the circuit made by the batted ball falling on one of the contacts 55, 56, 57, 58, the wheel 80 will start in motion due to the descent of the weighted arm 107 and, as above explained, the arm 111 fastened upon the driving shaft 105 will move downwardly with said arm 107. If we assume that a batted ball (having fallen upon the spring contact 56) entitles the player to a run to second-base, it will be understood that the wheel 80 must carry a button or traveler 79 from the home-base position to second-base and then must come to a positive stop; and to accomplish this result the upper end of the arm 111 after a sufficient number of the lugs 96 have passed the latch 97 to assure the carriage of the button or traveler to second-base, will move against the flexed spring 125 and press the same from the post 126, thereby breaking the circuit at said post and deënergizing the magnet 122 so that the latch 97 may assume its normal position and stop the wheel 80 at the time when said button or traveler is at the second-base.

If the batted ball has a game-value of three bases the circuit made by the ball falling upon the contact 57, will energize the magnet 122 and permit the withdrawal of the latch 97 from its operative position, and said magnet 122 will remain energized until the wheel 80 has carried three of its spokes or three lugs 96 by the said latch and the arm 111 has descended sufficiently to break the electric circuit at the post 132 by moving downwardly against the spring 126 and forcing said spring from its electrical connection with said post, the deënergizing of the magnet 122 by the breakage of the circuit at the post 132 permitting the latch 97 to return to its operative position for arresting the wheel, with the button or traveler 79 on the third base, said button or traveler having been carried to that position on a continuous run from home-base.

If the game-value of the ball should be a home-run, due to the ball falling upon the contact 58, the electric circuit will be maintained through the magnet 122 until the arm 111 has descended against and pressed the spring 127 from electrical connection with the post 133, thereby breaking the circuit at said post and deënergizing the magnet 122, the latch 97 being thereby permitted to regain its operative normal position and arrest the wheel 80 at the time that the button or traveler carried entirely around the diamond slot 77 on one continuous run arrives again at the home-base.

For a first-base run the ball falling upon the contact 55 will only energize the magnet 122 momentarily so that the one spoke that the latch 97 is in engagement with at the time may pass said latch, said latch immediately regaining its normal position so as to stop the wheel 80 after it has made a one-quarter turn carrying the button or traveler to first-base.

For a second-base run the latch 97 must remain out of its operative position long enough for two spokes of the wheel 80 to pass it, and therefore means are provided for maintaining the electric circuit through the magnet 122 until the two spokes of the wheel 80 pass said latch 97, and promptly thereafter the arm 111 by moving against the spring 125 breaks this circuit and allows the latch 97 to regain its operative position, so that upon the third spoke of the wheel reaching it, the wheel may be arrested.

For a third base-run the electric circuit must be maintained through the electro-magnet 122 until three spokes of the wheel 80 have passed by the latch 97, whereupon the arm 111 by moving against the spring 126 will break the circuit at the post 132 and permit the latch 97 to regain its operative position so that upon the fourth spoke of the wheel 80 reaching said latch, said wheel will become arrested thereby.

For a home-run, the electric circuit must be maintained through the electro-magnet 122 until the wheel 80 has carried its four spokes by the latch 97, and thereafter the circuit must be broken so that upon the button or traveler reaching the home-base position, the latch 97 may be in its operative position ready to stop the wheel 80, and this circuit is broken at the time specified by the arm 111 moving against the spring 127 and forcing the same from its electrical connection with the post 133.

The wheel 80 therefore makes a one-quarter turn to carry a button or traveler to first-base, a two-quarter turn for carrying the traveler to second-base, a three-quarter turn for carrying the traveler to third-base, and a complete rotation for carrying the traveler to make a home-run, and at each proper stage of its movement the wheel 80 becomes arrested by the latch 97, said latch by mechanism set into operation by the batted ball permitting the wheel 80 to perform its several movements in accordance with the game-values of the balls batted. I have described hereinbefore, that the movement of the wheel 80 is kept under control, so that it is not allowed to carry the buttons or travelers 79 so swiftly as to destroy the attractive feature of the diamond-indicator 68, by means of the electric brake represented by the disk 100 and magnet 101.

After each movement of the wheel 80 whether it be a quarter, half or three-quarter turn or a complete rotation, the attendant will grasp the arm 107 and push the same upwardly to its normal initial position indicated in Fig. 10, this movement having no effect upon the wheel 60, as hereinbefore explained. Each downward movement of the arm 107 effects a downward movement of the upper end of the arm 111, which arm not only breaks the circuits at the posts 131, 132, 133, but also slackens the chain 112 to relax the spring 115 and permit the rod 118 to slide downwardly so that the buttons or travelers 79 in the slot 78 may not be held pressed against the periphery of the moving wheel 80. When the attendant pushes the arm 107 upwardly for re-starting the same, the arm 111 is caused to move upwardly also, being fastened to the shaft 105, and thereby the chain 112 is again drawn taut and the spring 115 placed under tension, with the result that the arm 116 will press the rod 118 upwardly and cause this rod to force the then upper button or traveler 79 into the then lower slot 90 of the wheel 80, the spring 115 having sufficient tension to perform this duty even though there may be only one button left in the slot 78, the others being on the bases, as shown in Fig. 2.

In Fig. 18 I illustrate diagrammatically the electric circuits utilized in energizing the control-magnet 122 and in this figure I illustrate the spring contacts 55, 56, 57 and 58 upon which the batted balls descend and complete circuits through the contacts 59, 60, 61 and 62. Assuming that the batted ball has descended upon the contact 55 and entitles the player to a first-base run, the circuit through the electro-magnet 122 will be formed, commencing with the battery 137, through the conductor 138, conductor 139, conductor 63, contact 59, contact 55, conductor 140 and conductor 141, and thence through said magnet and the conductor 142 to the battery 137. The circuit just described is an ordinary simple electric circuit sufficient to enable the magnet 122 to momentarily trip the latch 97 so that the wheel 80 may carry one of its spokes by it, and this circuit becomes broken by the base-ball leaving the contact 55 and rolling down the trough 50. There is no necessity for a first-base run, to maintain the electric circuit through the electro-magnet 122 longer than is just sufficient for the one spoke of the wheel in engagement with the latch 97 to become freed from and start by said latch. For a second-base run, or a third-base run or a home-run, it is necessary to maintain the electric circuit through the electro-magnet 122 for a longer period so that two or more of the spokes of the wheel 80 may pass by the latch 97, and hence I provide relays 143, 144, 145, for maintaining local electric circuits through the magnet 122 for, respectively, second-base, third-base and home-runs, after the balls roll off from the contacts 56, 57 and 58.

When a batted ball falls upon the contact 56 and closes the circuit for a second-base run, the circuit will be formed, commencing with the battery 137, through the conductors 138, 139, 64, contacts 60, 56, conductor 146, through the relay 143, conductor 128, spring 125, post 131, conductor 134, conductor 140 (at the right of said conductor 134) and conductor 141 to the magnet 122, whence the conductor 142 leads back to the battery 137, the local circuit through the relay 143 being completed from the battery 137 through the conductor 148. The circuit having been established through the relay 143, the latter will maintain the same after the ball leaves the contact 56 until the circuit is broken by the arm 111 descending against and pressing the spring 125 from the post 131, at which time the circuit will be broken and the magnet 122 become deënergized.

For a third-base run the circuit made by the ball falling upon the spring contact 57 will be, commencing with the battery 137, through the conductors 138, 139, 65, contacts 61, 57, conductor 149, through the relay 144, conductor 129, spring 126, post 132, conductor 135 and conductor 141 to the magnet 122, whence the conductor 142 passes back to the battery 137. The local circuit created by the relay 144 will maintain the magnet 122 energized after the batted ball rolls from contact 57 and until the arm 111 has descended sufficiently to push the spring 126 from electrical engagement with the post 132, whereupon the circuit having been broken at said post, the magnet 122 will become deënergized and the latch 97 return to its operative position preparatory to stopping the wheel 80.

In the event that the batted ball entitles the player to a home-run, the circuit made by said ball falling upon the contact 58 will, starting with the battery 137, be through the conductors 138, 66, contacts 62, 58, conductor 151, relay 145, conductor 130, spring 127, post 133, conductor 136 and conductor 141 to the magnet 122, whence, as above mentioned, the conductor 142 leads back to the battery 137. The local circuit created by the presence of the relay 145 will maintain the electric circuit through the magnet 122 after the ball rolls off from the contact 58, until the arm 111 descends against and pushes the spring 127 from its electrical engagement with the post 133, whereupon the circuit having been broken at said post, the magnet 122 will become deënergized and the trip latch 97 will return to its normal operative position ready to arrest the wheel 80 upon the completion of the one rotation of the latter. It will be understood that the relays 143, 144 and 145 are introduced for their usual purposes of creating local circuits and maintaining the same through the electro-magnet 122 until the wheel 80 has performed its proper movement, and these local circuits are broken at the proper time by the arm 111 which travels with said wheel. No relay is provided for the circuit made by the ball falling upon the contact 55 because that circuit need only be maintained momentarily. In addition to the circuits hereinbefore described I provide one further circuit which is to be completed by the attendant pressing against the push button 153 provided in the side of the indicator casing 68, and this circuit is for the purpose of, at the end of a game, permitting the wheel 80 to have a sufficient rotation for returning all of the buttons or travelers 79 which may be on the bases, to the home slot 78 or to the position shown in Fig. 14, thereby, upon the resetting of the arm 107, leaving the entire apparatus in condition for starting a new game. The circuit through the magnet 122 created by pressing on the push button 153 will be through the relay 145, as shown in Fig. 18, the conductor 154 connected with said push-button leading to said relay, and the conductor 155 connected with the contact for said button leading to the battery-conductor 148. When the push-button 153 is pressed inwardly it completes a circuit through the magnet 122, with the result that the latch 97 is permitted to recede to its inoperative position and the weighted arm or motor 107 will descend and rotate the wheel 80 to return all of the buttons or travelers then on the bases to the home-slot 78, the arm 111 descending with the arm 107 so as to relax the spring 115 and permit the follower rod 118 to descend and enable said buttons to enter said slot. The circuit established by pressing the push button 153 inwardly will be broken at the post 133 when the arm 111 presses the spring 127 therefrom.

The construction of the relays 143, 144 and 145 will be recognized without detailed description, 156 designating their electro-magnets, 157 the armatures, 158 the plates against which the upper ends of said armatures contact when said armatures are attracted by said magnets and 159 the iron supporting frames, from which the plates 158 are insulated. The relays are provided simply to maintain the electro-magnet 122 energized a proper length of time for the buttons or travelers to make their respective runs after the balls roll off from the contacts 55, 56, 57, 58.

What I claim as my invention and desire to secure by Letters-Patent, is:—

1. In a game-apparatus of the character described, a chamber into which balls are to be driven, a target composed of strips of webbing secured in edge to edge relation at the inner end of said chamber and through which target the balls are to pass, independent chutes beyond said target to receive the balls, and electric contacts on which the balls fall upon descending within said chutes, combined with an indicator having a face possessing a diamond-slot, buttons to traverse said slot from base to base, means within said indicator for carrying said buttons along said slot, a device for actuating said button-carrying means, a stop to normally hold said button-carrying means stationary, and electrical means including a circuit for rendering said stop inoperative for a limited period upon a ball striking one of said contacts; substantially as set forth.

2. In a game-apparatus of the character described, a chamber into which balls are to be driven, a target composed of strips of webbing secured in edge to edge relation at the inner end of said chamber and through which target the balls are to pass, posts to which the ends of said strip are secured and one of which is capable of rotation for drawing said strips taut, independent chutes beyond said target to receive the balls, and electric contacts on which the balls fall upon descending within said chutes, combined with an indicator having a face possessing a diamond-slot, buttons to traverse said slot from base to base, means within said indicator for carrying said buttons along said slot, a device for actuating said button-carrying means, a stop to normally hold said button-carrying means stationary, and electrical means including a circuit for rendering said stop inoperative for a limited period upon a ball striking one of said contacts; substantially as set forth.

3. In a game-apparatus of the character described, a chamber into which balls are to be driven, independent chutes at the inner end of said chamber to respectively receive the balls of different game-values, and electric contacts to be acted upon by the balls entering said chutes, combined with an indicator having a face possessing a diamond-slot, buttons to traverse said slot from base to base, means within said indicator for carrying said buttons along said slot, a device for actuating said button-carrying means, a stop to normally hold said button-carrying means stationary, and electrical means including a circuit for rendering said stop inoperative for a limited period upon a ball striking one of said contacts; substantially as set forth.

4. In a game-apparatus of the character described, a chamber into which balls are to be driven, independent chutes at the inner end of said chamber to respectively receive the balls of different game-values, electric contacts to be acted upon by the balls entering said chutes, and inclined troughs leading from said chutes for directing the balls therefrom back to the batter's position, combined with an indicator having a face possessing a diamond-slot, buttons to traverse said slot from base to base, means within said indicator for carrying said buttons along said slot, a device for actuating said button-carrying means, a stop to normally hold said button-carrying means stationary, and electrical means including a circuit for rendering said stop inoperative for a limited period upon a ball striking one of said contacts; substantially as set forth.

5. In a game-apparatus of the character described, a chamber into which balls are to be driven, independent chutes at the inner end of said chamber to respectively receive the balls of different game-values, electric contacts to be acted upon by the balls entering said chutes, inclined troughs extending from said chutes toward the front of said chamber, a general receiving trough 54 into which said troughs lead, a receiver 49 for the balls rolling down said trough 54 and being open at one end of its bottom to permit one ball to settle down somewhat below the floor of said receiver, a spring below the open end of said receiver, and means for actuating said spring to eject upwardly the ball over it so that said ball may be batted, combined with an indicator having a face possessing a diamond-slot, buttons to traverse said slot from base to base, means within said indicator for carrying said buttons along said slot, a device for actuating said button-carrying means, a stop to normally hold said button-carrying means stationary, and electrical means including a circuit for rendering said stop inoperative for a limited period upon a ball striking one of said contacts; substantially as set forth.

6. In a game-apparatus of the character described, a chamber into which balls are to be driven, means for returning the balls to the front of said chamber, a general trough 54 to receive the balls returned, a receiver 49 connected therewith and into which the balls roll and which is open at one end of its bottom to permit one ball to settle down somewhat below the floor of said receiver, a spring below the open end of said receiver, and means for actuating said spring to eject upwardly the ball over it so that said ball may be batted; substantially as set forth.

7. In a game-apparatus of the character described, a chamber into which balls are to be driven, and electric contacts to be respectively engaged by the balls of different game-values, combined with an indicator having a face possessing a diamond-slot, buttons to traverse said slot from base to base, means within said indicator for carrying said buttons along said slot, a device for actuating said button-carrying means, a stop to normally hold said button-carrying means stationary, and electrical means including a circuit for rendering said stop inoperative for a limited period upon a ball striking one of said contacts; substantially as set forth.

8. In a game-apparatus of the character described, a series of electric contacts to be respectively engaged by driven balls in accordance with their respective game-values, combined with an indicator having a face possessing a diamond-slot, buttons to traverse said slot from base to base, means for carrying said buttons along said slot, a device for actuating said button-carrying means, a stop to normally hold said button-carrying means stationary, electrical means for rendering said stop inoperative upon a ball striking one of said contacts, and means for varying the periods during which said stop shall remain inoperative in accordance with the game values of the balls; substantially as set forth.

9. In a game-apparatus of the character described, a series of electric contacts to be respectively engaged by driven balls in accordance with their respective game-values, combined with an indicator having a face possessing a diamond-slot, buttons to traverse said slot from base to base, means for carrying said buttons along said slot, a device for actuating said button-carrying means, a stop to normally hold said button-carrying means stationary, electrical means for rendering said stop inoperative upon a ball striking one of said contacts, means acting in opposition to said actuating device for controlling the speed of said button-carrying means, and means for varying the periods during which said stop shall remain inoperative in accordance with the game-values of the balls; substantially as set forth.

10. In a game-apparatus of the character described, a series of electric contacts to be respectively engaged by driven balls in accordance with their respective game-values, combined with an indicator having a face-plate possessing a diamond-slot, buttons to traverse said slot, a wheel behind said face-plate and having in it radial slots for carrying said buttons along said diamond-slot, said radial slots permitting the buttons to slide back and forth in them to meet the requirements of said diamond-slot, means for actuating said wheel, a stop to normally hold said wheel stationary, electrical means for rendering said stop inoperative upon a ball striking one of said contacts, and means for varying the period during which said stop shall remain inoperative in accordance with the game-values of the balls; substantially as set forth.

11. In a game-apparatus of the character described, a series of electric contacts to be respectively engaged by driven balls in accordance with their respective game-values, combined with an indicator having a face-plate possessing a diamond-slot, buttons to traverse said slot, a wheel behind said face-plate and having in it radial slots for carrying said buttons along said diamond-slot, said radial slots permitting the buttons to slide back and forth in them to meet the requirements of said diamond-slot, means for actuating said wheel, a stop to normally hold said wheel stationary, electrical means for rendering said stop inoperative upon a ball striking one of said contacts, means acting in opposition to said wheel for controlling its speed, and means for varying the period during which said stop shall remain inoperative in accordance with the game-values of the balls; substantially as set forth.

12. In a game-apparatus of the character described, a series of electric contacts to be respectively engaged by driven balls in accordance with their respective game-values, combined with an indicator having a face-plate possessing a diamond-slot, buttons to traverse said slot, a wheel behind said face-plate and having in it radial slots for carrying said buttons along said diamond-slot, said radial slots permitting the buttons to slide back and forth in them to meet the requirements of said diamond-slot, means for actuating said wheel, a stop to normally hold said wheel stationary, electrical means for rendering said stop inoperative upon a ball striking one of said contacts, a rotary shaft (87) geared to said wheel and adapted to rotate oppositely thereto, a rotary disk (100) mounted on said shaft, pawl and ratchet mechanism normally connecting said disk with said shaft and adapted to impart motion to the same when said shaft is in motion and to permit the momentum of said disk to continue it in motion independently of said shaft when the latter stops, a magnet in whose field said disk rotates, and means for varying the period during which said stop shall remain inoperative in accordance with the game-values of the balls; substantially as set forth.

13. In a game-apparatus of the character described, a series of electric contacts to be respectively engaged by driven balls in accordance with their respective game-values, combined with an indicator having a face-plate possessing a diamond-slot, buttons to traverse said slot, a wheel behind said face-plate and having in it radial slots for carrying said buttons along said diamond-slot, said radial slots permitting the buttons to slide back and forth in them to meet the requirements of said diamond-slot, means for actuating said wheel, a stop to normally hold said wheel stationary, electrical means for rendering said stop inoperative upon a ball striking one of said contacts, means for delivering one of said buttons into said diamond-slot at the home-base position each time said wheel actuating means is reset after an operation of said wheel, and means for varying the period during which said stop shall remain inoperative in accordance with the game-values of the balls; substantially as set forth.

14. In a game-apparatus of the character described, a series of electric contacts to be respectively engaged by driven balls in accordance with their respective game-values, combined with an indicator having a face-plate possessing a diamond-slot and a home-slot leading thereto at the home-base position, buttons to traverse said diamond-slot and to initially lie within said home-slot, a wheel behind said face-plate and having in it radial slots for carrying said buttons along said diamond-slot, means for actuating said wheel, spring actuated means normally pressing the buttons in said home-slot toward said diamond-slot, a stop to normally hold said wheel stationary, electrical means for rendering said stop inoperative upon a ball striking one of said contacts so that said wheel may be rotated by its actuating means, means in operative connection with said wheel actuating means for releasing the spring pressure from said buttons in the home-slot while said wheel is in motion, and means for varying the period during which said wheel may remain in motion; substantially as set forth.

15. In a game-apparatus of the character described, a series of electric contacts to be respectively engaged by driven balls in accordance with their respective game-values, combined with an indicator having a face-plate possessing a diamond-slot and a home-slot leading thereto at the home-base position, buttons to traverse said diamond-slot and to initially lie within said home-slot, a wheel behind said face-plate and having in it radial slots for carrying said buttons along said diamond-slot, a shaft on which said wheel is loosely mounted, a driving-shaft, a ratchet wheel and gear wheel connected together and freely mounted on said driving shaft, a pinion wheel connected with said button-carrying wheel and engaged by said gear wheel, a pawl connected with said driving shaft for imparting motion through said ratchet wheel and gearing to said button-carrying wheel, a weight connected with and projected from one side of said driving shaft for operating the same and said wheel, spring-actuated means normally pressing the buttons in said home-slot toward said diamond-slot, a stop to normally hold said wheel stationary, electrical means for rendering said stop inoperative upon a ball striking one of said contacts so that said wheel may be rotated by its actuating means, means in operative connection with said wheel actuating means for releasing the spring pressure from said buttons in the home-slot while said wheel is in motion, and means for varying the period during which said wheel may remain in motion; substantially as set forth.

16. In a game-apparatus of the character described, a series of electric contacts to be respectively engaged by driven balls in accordance with their respective game-values, combined with an indicator having a face-plate possessing a diamond-slot and a home-slot leading thereto at the home-base position, buttons to traverse said diamond-slot and to initially lie within said home-slot, a wheel behind said face-plate and having in it radial slots for carrying said buttons along said diamond-slot, a shaft on which said wheel is loosely mounted, a driving-shaft, a ratchet wheel and gear wheel connected together and freely mounted on said driving shaft, a pinion wheel connected with said button-carrying wheel and engaged by said gear wheel, a pawl connected with said driving shaft for imparting motion through said ratchet wheel and gearing to said button-carrying wheel, a weight connected with and projected from one side of said driving-shaft for operating the same and said wheel, an arm (111) secured to said shaft, a follower rod (118) to press the buttons from said home-slot into said diamond-slot, spring mechanism for acting against said rod comprising a coiled spring, an arm connected therewith and with said rod and another arm connected with said spring and with said arm (111) so that upon the latter arm moving in one direction it may place a tension in said spring and in the opposite direction it may relieve said tension, a stop to normally hold said wheel stationary, electrical means for rendering said stop inoperative upon a ball striking one of said contacts, and means for varying the period during which said stop shall remain inoperative in accordance with the game-values of the balls; substantially as set forth.

17. In a game-apparatus of the character described, an indicator having a face-plate possessing a diamond-slot, a wheel behind said face-plate and having in it radial slots for carrying said buttons along said diamond-slot, said radial slots permitting the buttons to slide back and forth in them to meet the requirements of said diamond-slot, means for actuating said wheel, a stop to normally hold said wheel stationary, means to be rendered active by driven balls for effecting the release of said stop, means for restoring said stop to its operative position, and means for varying the period during which said stop may remain inoperative in accordance with the game-values of the balls; substantially as set forth.

18. In a game-apparatus of the character described, an indicator having a face-plate possessing a diamond-slot, a wheel behind said face-plate and having in it radial slots for carrying said buttons along said diamond-slot, said radial slots permitting the buttons to slide back and forth in them to meet the requirements of said diamond-slot, means for actuating said wheel, a stop to normally hold said wheel stationary, means to be rendered active by driven balls for effecting the release of said stop, means for restoring said stop to its operative position, means for varying the period during which said stop may remain inoperative in accordance with the game-values of the balls, and means for acting in opposition to said wheel for controlling the speed of the latter; substantially as set forth.

19. In a game-apparatus of the character described, an indicator having a face-plate possessing a diamond-slot, a wheel behind said face-plate and having in it radial slots for carrying said buttons along said diamond-slot, said radial slots permitting the buttons to slide back and forth in them to meet the requirements of said diamond-slot, means for actuating said wheel, a stop to normally hold said wheel stationary, means to be rendered active by driven balls for effecting the release of said stop, means for restoring said stop to its operative position, means for varying the period during which said stop may remain inoperative in accordance with the game-values of the balls, a rotary shaft (87) geared to said wheel and adapted to rotate oppositely thereto, a rotary disk (100) mounted on said shaft, pawl and ratchet mechanism normally connecting said disk with said shaft and adapted to impart motion to the same when said shaft is in motion and to permit the momentum of said disk to continue it in motion independently of said shaft when the latter stops and a magnet in whose field said disk rotates; substantially as set forth.

20. In a game-apparatus of the character described, an indicator having a face-plate possessing a diamond-slot, a wheel behind said face-plate and having in it radial slots for carrying said buttons along said diamond-slot, said radial slots permitting the buttons to slide back and forth in them to meet the requirements of said diamond-slot, means for actuating said wheel, a stop to normally hold said wheel stationary, means to be rendered active by driven balls for effecting the release of said stop, means for restoring said stop to its operative position, means for varying the period during which said stop may remain inoperative in accordance with the game-values of the balls, and means for delivering one of said buttons into said diamond-slot at the home-base position each time said wheel actuating means is reset after an operation of said wheel; substantially as set forth.

21. In a game-apparatus of the character described, an indicator having a face-plate possessing a diamond-slot and a home-slot leading thereto at the home-base position, buttons to traverse said diamond-slot and to initially lie within said home-slot, a wheel behind said face-plate and having in it radial slots for carrying said buttons along said diamond-slot, said radial slots permitting the buttons to slide back and forth in them to meet the requirements of said diamond-slot, means for actuating said wheel, spring actuated means normally pressing the buttons in said home-slot toward said diamond-slot, a stop to normally hold said wheel stationary, means to be rendered active by driven balls for effecting the release of said stop, means for restoring said stop to its operative position, means for varying the period during which said stop may remain inoperative, and means in operative connection with said wheel actuating means for holding said spring pressure released from said buttons in the home-slot while said wheel is in motion; substantially as set forth.

22. In a game-apparatus of the character described, an indicator having a face-plate possessing a diamond-slot and a home-slot leading thereto at the home-base position, buttons to traverse said diamond-slot and to initially lie within said home-slot, a wheel behind said face-plate and having in it radial slots for carrying said buttons along said diamond slot, a shaft on which said wheel is loosely mounted, a driving shaft, a ratchet wheel and gear wheel connected together and freely mounted on said driving shaft, a pinion wheel connected with said button carrying wheel and engaged by said gear wheel, a pawl connected with said driving shaft for imparting motion through said ratchet wheel and gearing to said button carrying wheel, a weight connected with and projected from one side of said driving shaft for operating the same and said wheel, an arm (111) secured to said shaft, a follower rod (118) to press the buttons from said home-slot into said diamond-slot, spring mechanism for acting against said rod comprising a coiled spring, an arm connected therewith and with said rod and another arm connected with said spring and with said arm 111 so that upon the latter arm moving in one direction it may place a tension in said spring and in the opposite direction it may relieve said tension, a stop to normally hold said wheel stationary, means to be rendered active by driven balls for effecting the release of said stop, means for restoring said stop to its operative position, and means for varying the period during which said stop shall remain inoperative; substantially as set forth.

23. In a game-apparatus of the character described, a series of electric contacts to be respectively engaged by driven balls in accordance with their respective values, combined with an indicator having a face possessing a diamond-slot, buttons to traverse said slot, means for carrying said buttons along said slot, a device normally exerted to actuate said button-carrying means, a stop to normally hold said button-carrying means stationary, an electro-magnet with circuit conductors leading from said contacts for rendering said stop inoperative by a ball striking one of said contacts, relays and conductors for respectively maintaining a local circuit through said electro-magnet after the balls leave said contacts, and means operable with said button-carrying means for breaking said local circuits and thereby deënergizing said electro-magnets at varying points in accordance with the game-values of the driven balls and the distance said buttons are to travel; substantially as set forth.

Signed at New York city, in the county of New York, and State of New York, this 12th day of February, A. D. 1907.

DAVID G. BLACK.

Witnesses:
CHAS. C. GILL,
ARTHUR MARION.